United States Patent [19]

Zorzolo

[11] Patent Number: 5,532,564
[45] Date of Patent: Jul. 2, 1996

[54] CONTROL UNIT FOR AN ELECTRIC DRIVE MOTOR OF INDUSTRIAL PROCESSING MACHINERY

[75] Inventor: Alessandro Zorzolo, Pavia, Italy

[73] Assignee: Comelz S.p.A., Pavia, Italy

[21] Appl. No.: 377,673

[22] Filed: Jan. 24, 1995

Related U.S. Application Data

[63] Continuation of Ser. No. 187,423, Jan. 25, 1994, abandoned, which is a continuation of Ser. No. 853,932, Mar. 19, 1992, Pat. No. 5,336,981.

[30] Foreign Application Priority Data

Mar. 27, 1991 [EP] European Pat. Off. ............. 91830119

[51] Int. Cl.⁶ ..................................... D05B 69/06
[52] U.S. Cl. ........................... 318/551.000; 318/254.000; 112/277.000
[58] Field of Search ................................... 318/254, 551, 318/268, 269, 270, 271, 139; 112/270, 271, 274, 275, 277

[56] References Cited

U.S. PATENT DOCUMENTS

| | | |
|---|---|---|
| 3,562,616 | 2/1971 | Elliott . |
| 3,639,877 | 2/1972 | Fresard et al. ........................... 318/153 |
| 3,818,292 | 6/1974 | Berman .................................... 318/139 |
| 4,086,519 | 4/1978 | Persson .................................... 318/254 |
| 4,137,860 | 2/1979 | Yoneji et al. ............................ 112/277 |
| 4,354,145 | 10/1982 | Janssen .................................... 318/254 |
| 4,399,393 | 8/1983 | Santini ................................. 318/551 X |
| 4,499,449 | 2/1985 | Shinozaki et al. . |
| 4,535,275 | 8/1985 | Muller ..................................... 318/254 |
| 4,578,624 | 3/1986 | Neki et al. ........................... 318/139 X |
| 4,633,149 | 12/1986 | Welterlin ................................. 318/254 |

Primary Examiner—Bentsu Ro
Attorney, Agent, or Firm—Nims Howes Collison Hansen & Lackert

[57] ABSTRACT

A control unit for an electric drive motor of industrial processing machinery includes a control arrangement which drives a pair of magnets generating a magnetic flux and a Hall effect sensor disposed between the magnets so as to be swept by the magnetic flux rotatively with respect to each other; the Hall effect sensor outputs an electric signal which varies consistently with the position setting of the control arrangement and drives the electric motor accordingly; the movement of the control arrangement is resisted by springs having different degrees of stiffness from one another; proper interaction can thus be established between the operator and the machine.

4 Claims, 5 Drawing Sheets

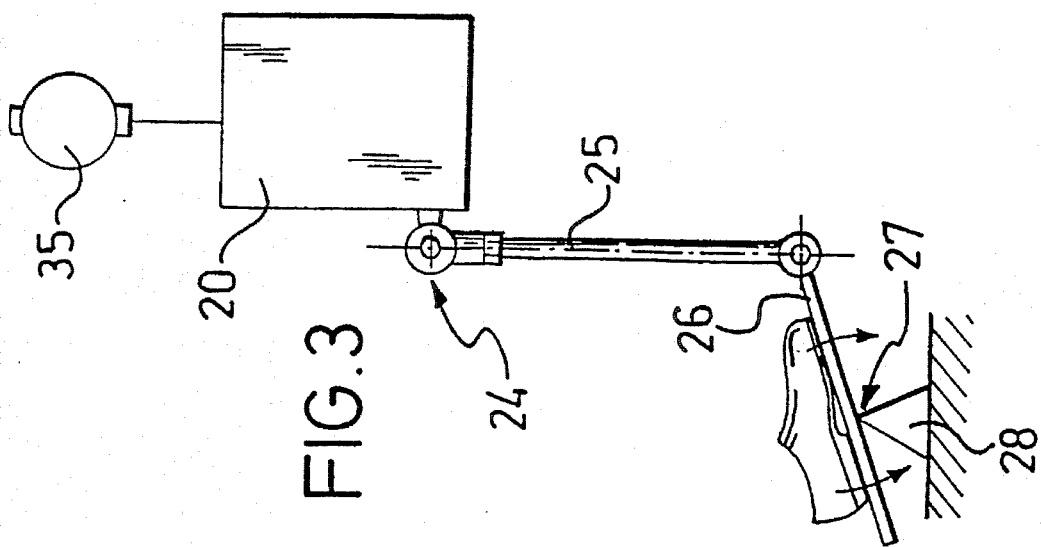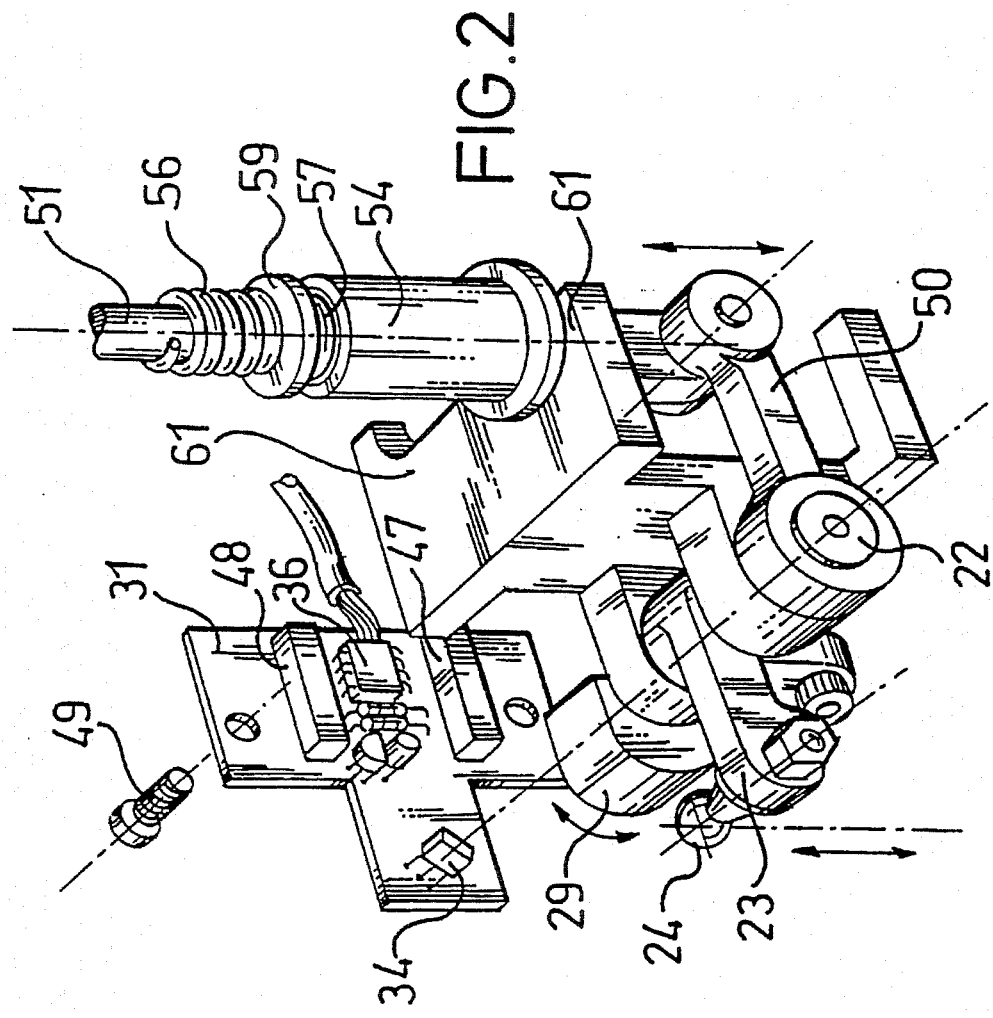

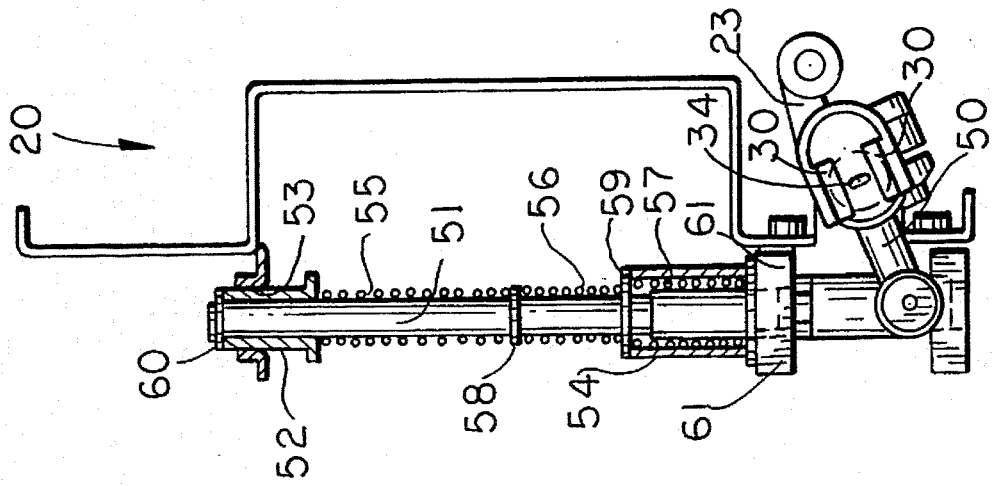
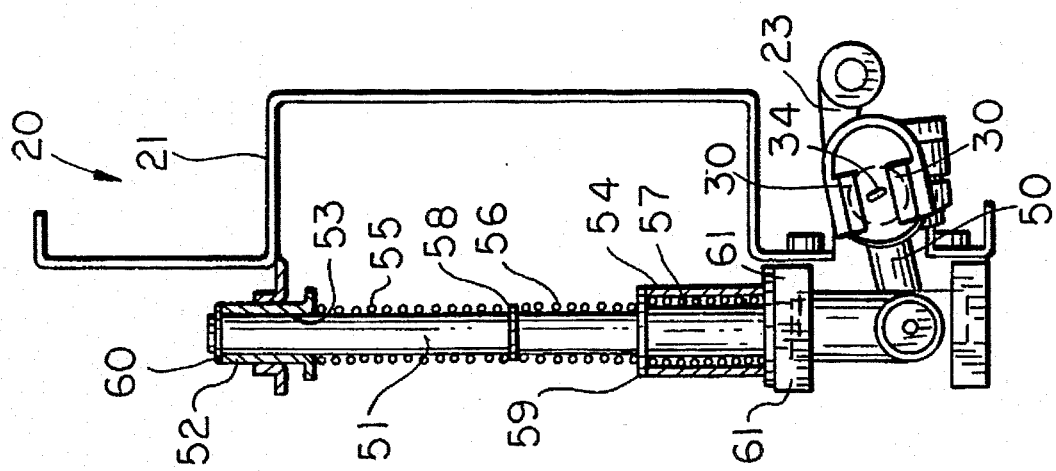

CONTROL UNIT FOR AN ELECTRIC DRIVE MOTOR OF INDUSTRIAL PROCESSING MACHINERY

This application is a continuation of application Ser. No. 08/187,423, filed Jan. 25, 1994, now abandoned, which is a continuation of application Ser. No. 07/853,932, filed Mar. 19, 1992, now U.S. Pat. No. 5,336,981, issued Aug. 9, 1994.

DESCRIPTION

This invention relates to a control unit for an electric drive motor of industrial processing machinery.

Known are control units for controlling electric drive motors of industrial sewing machines, which comprise a control arrangement of the foot pedal type to operate a device which senses the foot pedal position and is connected to the electric motor. The foot pedal position sensing device outputs a signal which varies consistently with the foot pedal position and drives the electric motor accordingly.

The foot pedal can be operated in two opposite directions. When operated in one direction, the foot pedal moves from a starting position where the electric motor is de-energized to an end position where the electric motor is energized at its maximum speed, the intermediate positions to the start and end positions of the foot pedal providing intermediate speeds of the electric motor. When operated in the opposite direction, the foot pedal moves to a first position where the cloth down-pressing shoe is raised and then to a successive position where the needle is raised.

The device for sensing the foot pedal position may either employ photocells or electric contacts to be closed sequentially by the pedal movement. Such prior arrangements, however, are cost-intensive, prone to fail, and have a low resolution.

To overcome such deficiencies, arrangements have been provided which utilize the Hall effect, wherein a permanent magnet is brought, by operation of the foot pedal, toward or away from a Hall effect sensor according to the pedal movement; the Hall sensor, being suitably powered, will issue an electric voltage signal consistent with the position of said magnet. This output signal then drives the electric motor accordingly, via a control processor.

The currently available control units for the electric motors of industrial sewing machines have regrettably a serious drawback in that they disallow any proper interaction between the operator and the machine. That is, such control units provide no assistance, as expected instead of them, in translating the command from the operator into a corresponding operation of the electric motor driving the machine.

One of the causes for this resides indeed in the Hall effect detector. In fact, the pattern of the Hall effect sensor voltage output versus the magnet position is a hyperbolic one, and accordingly, when the magnet lies close to the sensor, a small movement of the foot pedal is enough to produce a large change in the sensor output voltage, whereas when the magnet is held away from the sensor, large movements of the pedal are required to bring about significant changes in that output voltage. This resulta in a non-linear response of the control unit which hinders control of the electric motor as desired by the operator. In addition, any small changes in the sensor temperature will reflect in minor variations of its output voltage which, with the magnet held away from the sensor, are erroneously taken as movements of the foot pedal.

This invention is directed to obviating such serious drawback of the currently available control units, whereby no proper interaction is afforded between the operator and the machine.

According to this invention, there is provided a control unit for an electric drive motor of industrial processing machinery, comprising a control arrangement effective to move a magnetic flux generating means and a Hall effect sensor swept by said magnetic flux relatively to each other, thereby the Hall effect sensor will output an electric signal which varies consistently with the control arrangement position and drives the electric motor accordingly, characterized in that the magnetic flux generating means and the Hall effect sensor are moved relatively to each other of rotary motion.

For a better understanding of the features and the advantages of this invention, a non-limitative embodiment thereof will be described hereinafter with reference to the accompanying illustrative drawings, where:

FIG. 2 is a detail view of the device shown in FIG. 1;

FIG. 3 is a general view showing schematically said foot pedal control unit;

FIGS. 8, 9, 10, 11 and 12 illustrate the performance of the device shown in FIG. 1.

Figure 1:
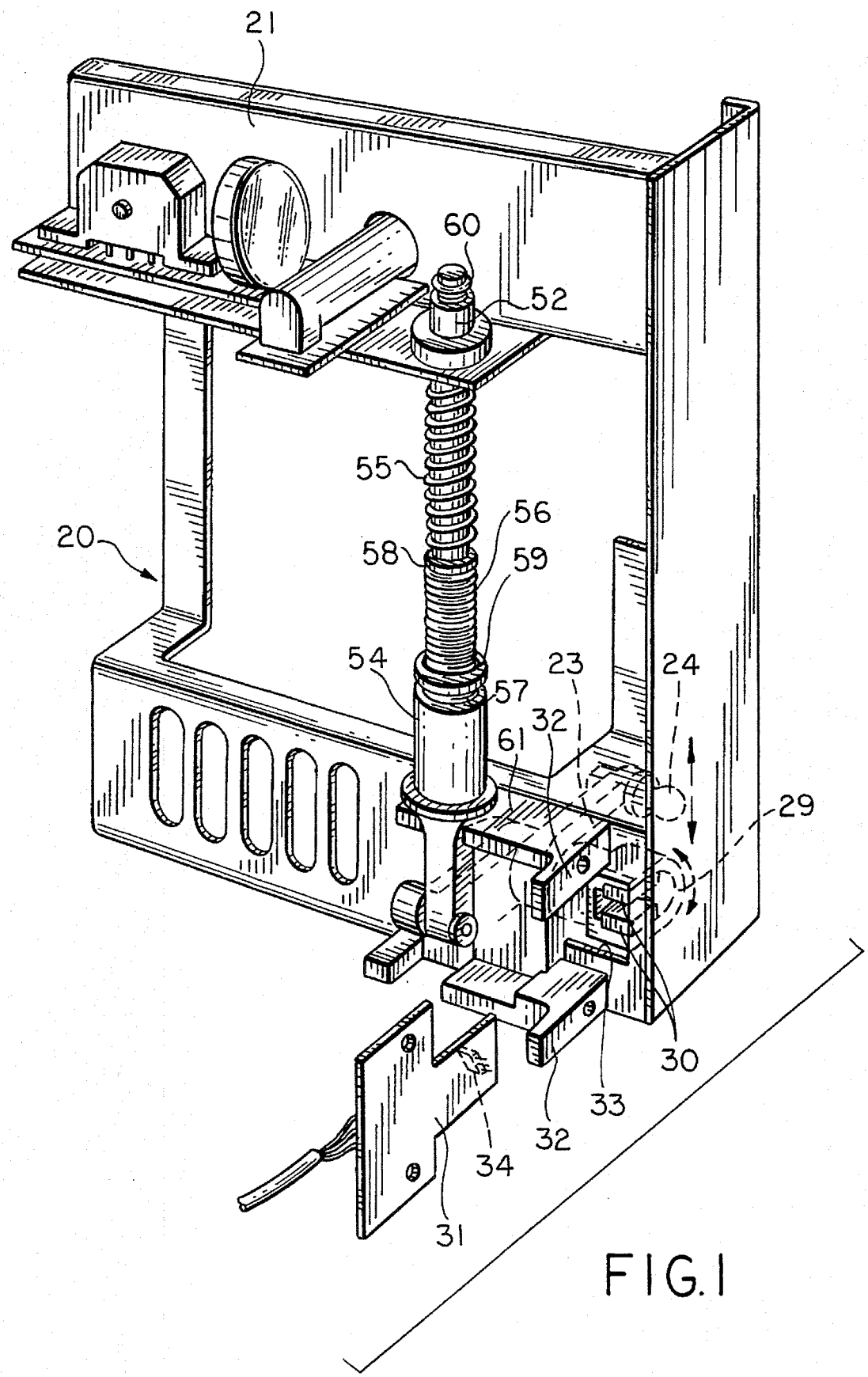
FIG. 1 is a perspective view of a device, intervening between the foot pedal and the electric motor, incorporated to a unit according to the invention for pedal controlling an electric drive motor of an industrial sewing machine.

The device in FIG. 1, generally designated 20, comprises a bearing structure 21 whereon a shaft 22 (FIG. 2) is journalled.

Attached to the shaft 22 is a lever 23 carrying on one end an attachment member 24. A rod 25 is connected to the attachment member 24 on which a foot pedal 26 (FIG. 3) is arranged to act.

The foot pedal 26 is pivoted at 27 on a base 28 resting on the floor. Pivotal movements of the foot pedal about its pivot center 27 in either direction will cause corresponding rotary movements to be imparted to the shaft 22 through the rod 25 and the lever 23.

Attached to one end of the shaft 22 is a substantially C-shaped member made of a ferromagnetic material, as shown at 29, opposed wings whereof mount two permanent magnets 30.

A small plate 31 is secured realeasably on the bearing structure 21 at the location of the C-shaped member 29. Specifically, this small plate 31 is received in a seat on the bearing structure 21 being defined by two shoulders 32 and a window 33, and is fastened to the shoulders 32 by screws 49 (FIG. 2).

The small plate 31 carries a Hall effect sensor 34 mounted thereon which locates between the two permanent magnets 30.

The two magnets 30 are positioned to have opposite sign poles facing each other, thereby a magnetic flux is established across the C-shaped member 29 and the gap between the two magnets 30 which will affect the Hall effect sensor 34.

By turning the shaft 22 under control by the foot pedal 26, the C-shaped member 29, and hence the magnets 30, are rotated such that the Hall effect sensor 34 will be swept by the magnetic flux under a varying angle. This results in a variation of the output voltage from the sensor 34, to which an appropriate electric current would be supplied.

Figure 6:
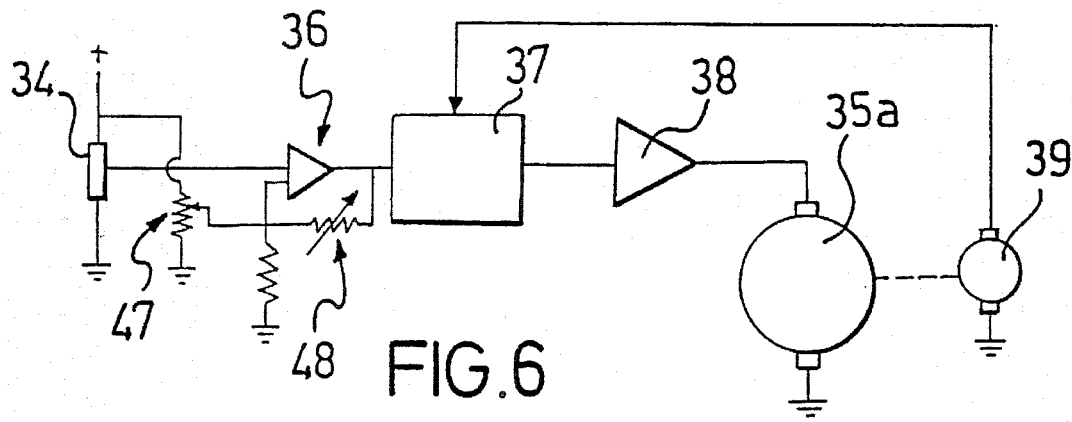
FIGS. 6, 7 show two alternative electronic circuits of said foot pedal control unit.
Figure 7:
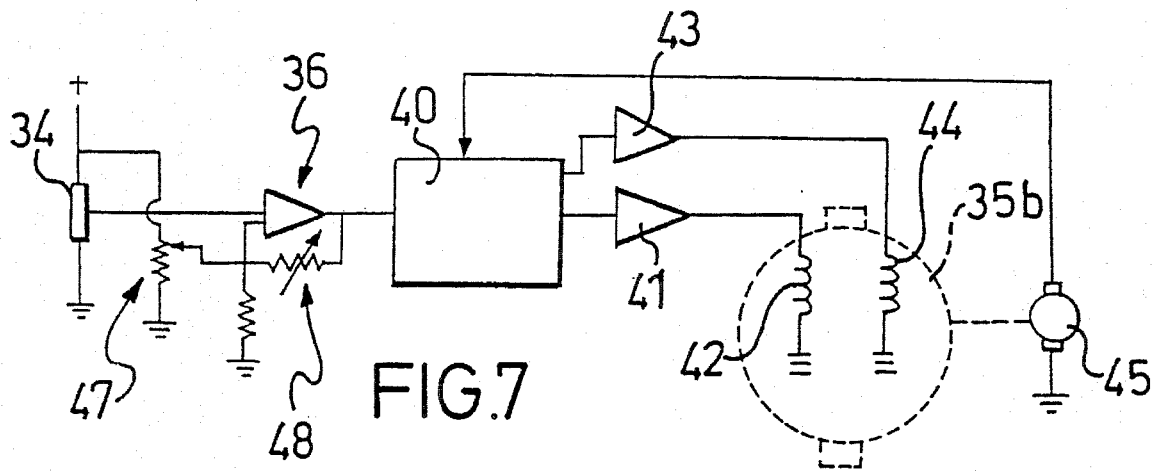

This output voltage correspondingly drives an electric motor 35 (FIG. 3) of the industrial sewing machine, e.g. through either of the two circuits shown in FIGS. 6, 7.

The circuit shown in FIG. 6 relates to a brush-less electric motor 35A. The Hall effect sensor 34 output is connected to an adjustable gain amplifier 36 having its output connected, in turn, to a microprocessor-type processing and control unit 37 of a conventional variety. The unit 37 has its output connected to the electric motor 35A via an amplifier 38. A DC generator-type tachometer 39, driven rotatively by the electric motor 35A and being connected with its output to the unit 37, supplies the unit 37 with a reading of the electric motor 35A instant speed.

The output voltage from the sensor 34 is amplified by the amplifier 36 and supplied to the unit 37, which will output consistently with the value of this amplified voltage an appropriate power signal, as amplified by the amplifier 38, to the electric motor 35A, thereby causing it to operate at the rate set by the pedal 26 position; the unit 37 will then take control of this speed by means of the DC generator tachometer 39.

The circuit of FIG. 7 relates to an electric motor 35B having an electromagnetic clutch and electromagnetic brake. Here again, the output of the Hall effect sensor 34 is connected to an adjustable gain amplifier 36. The amplifier 36 is, in turn, connected with its output to a processing and control unit 40 having its output connected both to a coil 42 of the electric clutch for the electric motor 35B, via an amplifier 41, and to a coil 44 of the electromagnetic brake for the electric motor 35B via an amplifier 43. A DC generator type of tachometer 45, driven rotatively by the electric motor 35B and having its output connected to the unit 40, supplies said unit 40 with a reading of the instant speed of the electric motor 35B.

The voltage output from the sensor 34 is amplified by the amplifier 36 and passed to the unit 40 which, consistently with the value of this amplified voltage, will send an appropriate power signal, as amplified by the amplifier 41, to the coil 42, thereby causing the electromagnetic clutch to become engaged or disengaged and therefore control the speed of the electric motor 35B, using a known technique. Where the aforesaid voltage output from the sensor 34 relates to the stop control for the motor 35B, the unit 40 will send an appropriate amplified power signal to the coil 42, thereby disengaging the electromagnetic clutch, and send an appropriate power signal, as amplified by the amplifier 43, to the coil 44 effective to apply the electromagnetic brake, and accordingly, bring the electric motor 35B to a stop. The DC generator tachometer 45 allows the unit 40 to control the speed of the electric motor 35B.

Briefly, by acting on the foot pedal 26, the magnets 30 are made to rotate relatively to the Hall effect sensor 34 and produce a change in the output voltage from the latter effective to correspondingly drive the electric motor 35.

Figure 4:
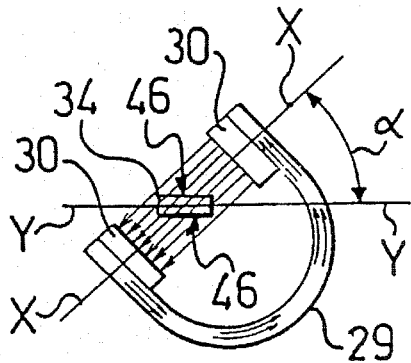
FIG. 4 shows schematically the operation of the detail in FIG. 2.
Figure 5:
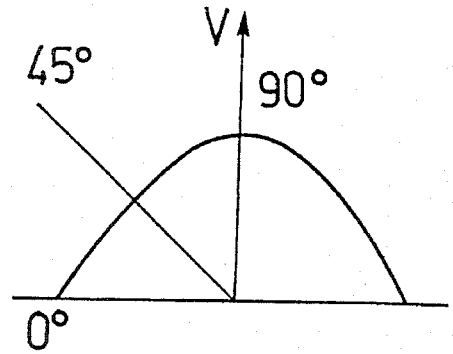
FIG. 5 is a graph illustrating what takes place in FIG. 4.

With reference to FIGS. 4, 5, the output voltage V from the sensor 34 is equal to the magnetic flux generated by the permanent magnets 30 multiplied by the sine of the angle alpha between the axis X relative to the direction of the magnetic flux and the axis Y of the sensor lying parallel to the sensitive faces 46 of the sensor. By causing the full angular movement of the foot pedal 26 to correspond with a change of the angle alpha in the 0° to 45° range, a substantially linear pattern can be attained for the voltage V as the angle alpha varies (FIG. 5).

Thus, a linear response is obtained from the control unit which allows the operator to control at will the electric motor 35 of the sewing machine.

Further, by virtue of said linear response, any small change in the output voltage from the sensor 34, as due to a change in the sensor temperature, would be only taken as a minor, and hence of little significance, change in the pedal 26 position which leaves the command issued and wanted by the operator substantially unaltered.

It should be noted that, with the Hall effect sensor 34 positioned to correspond with a zero-degree value of the angle alpha, the magnetic flux lines would lie parallel to the sensitive faces 46 of the sensor, thereby, with said faces unaffected by the magnetic flux, the value of the sensor output voltage would be nil irrespective of the sensor temperature. By having said position of the sensor 34 coincident with the home position of the foot pedal 26, the electronic portion of the control unit would be properly re-set each time that the pedal is returned to said home position.

It stands to reason that with the sensor 34 positioned to correspond with a value of 45 degrees of the angle alpha, the voltage output from the sensor would be at a maximum.

Two variable resistors, shown at 47 and 48, are provided both in the circuit of FIG. 6 and the circuit of FIG. 7. The variable resistor 47 is used to set the sensor 34, and the variable resistor 48 is used for adjusting the gain of the amplifier 36, thereby to accommodate in mass manufacture the differences between sensors and between permanent magnet pairs.

Advantageously, the amplifier 36 and the variable resistors 47 and 48 are mounted on the plate 31 which also mounts the Hall effect sensor 34. In this way, in the event of failure of one or more of the aforesaid electronic components, the screws 49 would be taken out, and the plate 31 removed and replaced with a similar one carrying those same electronic components.

Also attached to the shaft 22 is a further lever 50 which is pivoted at one end on a corresponding end of a stem 51 (FIG. 2). As shown in FIGS. 8 to 12, the stem 51 fits, with its remote end from said pivoted end, inside a bush 52 axially slidably therethrough, said bush fitting, in turn, axially slidable in a seat 53 formed in the bearing structure 21. Fitted in an axially slidable manner over the opposed end of the stem 51 is a further bush 54. Slipped over the stem 51 are, moreover, three spiral springs 55, 56, 57. The spring 55 extends between the bush 52 and a ring 58 attached to the stem 51; the spring 56 extends between the fixed ring 58 and a ring 59 fitted over the stem 51 for free sliding movement therealong; and the spring 57 extends between the sliding rings 59 and the bottom of the bush 54 where the spring 57 is received. The spring 55 has a lower stiffness than the spring 57 which, in turn, is less stiff than the spring 56. A ring 60, affixed to the stem 51, is provided on the free end of the stem 51 at the location of the bush 52.

Figure 9:
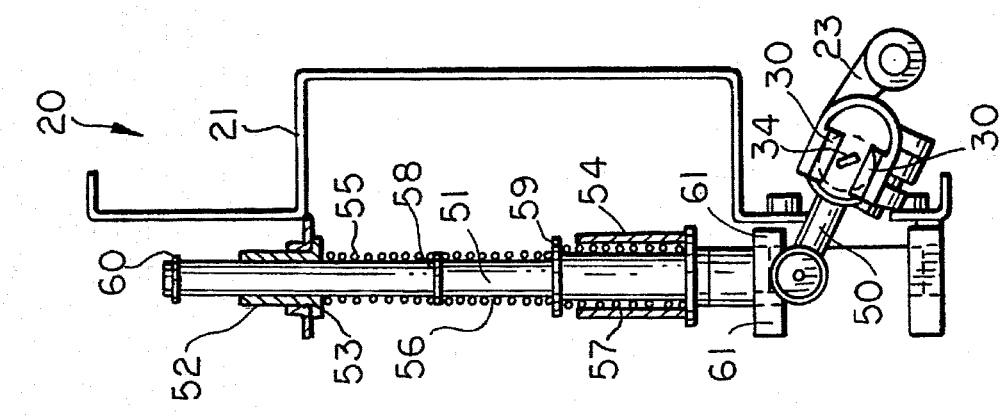
Figure 8:
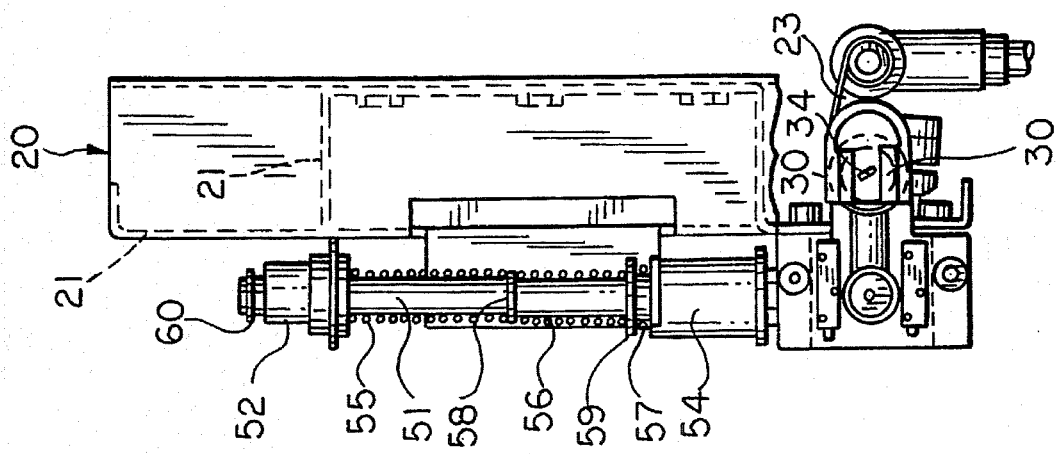

FIGS. 8 and 9 illustrate an actuation of the device 20 which corresponds to full pivoting of the foot pedal shown in FIG. 3 in the clockwise direction, to produce a condition of full speed for the electric motor 35 of the sewing machine. As may be appreciated, additionally to the aforementioned and discussed rotation of the permanent magnets 30 relatively to the Hall effect sensor 34, there occurs an upwardly directed sliding movement of the rod 51. This movement causes the bush 54 to come closer to the bush 52, and hence, a compressive action on the three springs 55, 56, 57, with just the spring 55 yielding thereto because less stiff the the other two.

On releasing the foot pedal 26 from said setting of full motor speed, the spring 55 will return the rod 51 elastically to a home position where the bush 54 abuts against abutment portions 61 of the bearing structure 21 and the ring 60 abuts against the bush 52. The position shown in FIG. 10 corresponds to a home position of the control unit, or position of zero speed of the electric motor 35.

Thus, the pivotal movement of the foot pedal 26 in the clockwise direction allows the speed of the electric motor 35 to be controlled.

Figure 10:
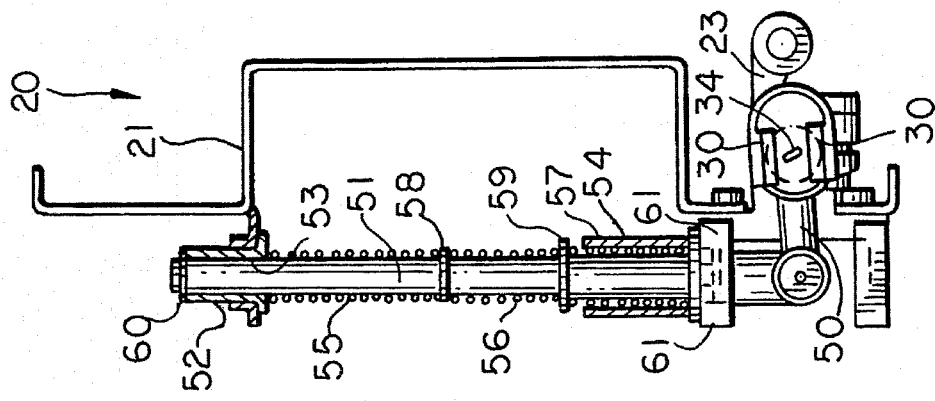

FIGS. 10 and 11 illustrate the transition from said home position to a position, to be attained by pivoting the pedal 26 in the counterclockwise direction, where the electric motor 35 is held de-energized and the cloth down-pressing shoe of the sewing machine is raised. Said movement of the foot pedal 26 causes the fixed ring 58 to come closer to the bush 54, and accordingly, a compressive action to be applied to the springs 56, 57 of which only the spring 57 will yield because less stiff than the other spring. The ring 59 will abut on the bush 54.

FIGS. 11 and 12 illustrate the transition from said cloth down-pressing shoe raise setting to a setting, to be attained by further pivoting the foot pedal 26 in the counterclockwise direction, whereby operation at a predetermined low speed is provided for raising the sewing machine needle. In this case, the fixed ring 58 is moved closer to the moving ring 59 abutting the bush 54 and the spring 56, therefore, is caused to yield elastically.

Summing it up, the pedal 26 movement affecting control of the electric motor 35 speed will meet some elastic opposition from the spring 55, the pedal 26 movement controlling the raising of the cloth down-pressing shoe will meet greater elastic opposition from the spring 57, and the pedal 26 movement controlling the needle raising will meet even greater elastic opposition from the spring 56.

Thus, the operator is afforded, by virtue of these different amounts of elastic resistance, a "feel" of the command given to the control unit.

It should be noted that abutment of the bush 54 against the portions 61 of the bearing structure 21 and abutment of the ring 60 against the bush 52 will enable the operator to perceive the transition from a motor speed control setting (FIG. 9) to the cloth down-pressing shoe raise setting (FIG. 11).

Likewise, abutment of the ring 59 against the bush 54 allows the operator to perceive the transition from the cloth down-pressing shoe raise setting (FIG. 11) to the needle raise setting (FIG. 12).

During the movements from the home position (FIG. 10) of the cloth down-pressing shoe to the raised position (FIG. 11) and from the latter position to the needle raised position (FIG. 12), the ring 60 will push the bush 52 downwards to maintain a constant elastic load from the spring 55 on the stem 51, so as to leave the action from the springs 56 and 57 unaffected.

Understandably, changes and/or additions are feasible to what has been herein described and illustrated.

The configurations of the bearing structure and the elements which make up the device 20 may be other than described.

The permanent magnets may be replaced by equivalent means capable of generating a magnetic flux, such as by electromagnets.

It may also be arranged that the Hall effect sensor rotates relatively to the magnetic flux generator means.

Control and processing circuits other than those shown in FIGS. 6, 7 may be provided, for equivalent functions.

The different elastic resistances in the control unit could be provided, in general, by fitting over the stem a plurality of spiral springs to elastically oppose the stem sliding movement, each spring having a different degree of stiffness from the other springs to resist the stem sliding movement along different sections of the stem travel stroke.

In general, this control unit may be used, with some obvious adaptations, with any electric motor of any industrial processing machine.

I claim:

1. A control unit for an electric drive motor of industrial processing machinery comprising:

magnetic flux generating means and Hall effect sensor means, the magnetic flux generating means and the Hall effect sensor means disposed adjacent to each other at a fixed distance relative to each other, the magnetic flux generating means and Hall effect sensor means being rotatably movable relative to each other, such that the Hall effect sensor means are swept rotatably by a magnetic flux generated by the magnetic flux generating means, an electric signal generated by the Hall effect sensor means being variable linearly with the amount of relative rotation for linearly controlling the electric drive motor, said magnetic flux generating means comprising a pair of oppositely located magnets, having opposite poles facing each other, where between the Hall effect sensor is disposed.

2. A control unit according to either claim 1, wherein the relative rotation of the magnetic flux generating means and the Hall effect sensor means occurs within an angle defined by an axis related to the magnetic flux direction and an axis of the sensor means lying parallel to the sensing faces of the sensor means in the 0° to 45° range.

3. A control unit according to claim 1 wherein the electric drive motor is a brushless DC electric motor, and, further comprising a microprocessor type control and processing unit, a variable resistor, for setting the Hall effect sensor means, and an adjustable gain amplifier being located between the Hall effect sensor means and the microprocessor control and processing unit.

4. A control unit according to claim 3, wherein the Hall effect sensor means, said variable resistor, and said adjustable gain amplifier are mounted on a small plate received releasably in a seat formed on a bearing structure for the control and processing unit at the location of said magnetic flux generating means.

\* \* \* \* \*